Patented Feb. 22, 1944

2,342,606

UNITED STATES PATENT OFFICE 2,342,606

ACETYLATED PIMELIC ACIDS

Herman A. Bruson, Philadelphia, Pa., assignor to The Resinous Products & Chemical Company, Philadelphia, Pa., a corporation of Delaware No Drawing. Application October 11, 1941, Serial No. 414,598

4 Claims. (Cl. 260—537)

This invention relates to $\gamma$-acetyl-$\gamma$-alkyl pimelic acids having the formula:

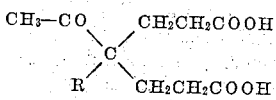

wherein R is a saturated alkyl group, and a method for their preparation.

These acids are new compounds which are useful in the preparation of resins of the alkyd or nylon type. In the form of their esters, they are useful as plasticizers for cellulose esters, cellulose ethers, as well as other resinous plastics.

According to this invention, $\gamma$-acetyl-$\gamma$-alkyl pimelic acids of the above type are obtained by hydrolyzing the reaction products obtained by condensing acrylonitrile in the presence of alkaline condensing agents with aliphatic methyl ketones having the formula $$CH_3COCH_2-R$$

wherein R is a saturated alkyl group.

The preparation of the said reaction products is described in co-pending application Serial No. 389,332, filed April 19, 1941, of which this application is a continuation in part. According to the method there disclosed, a saturated aliphatic methyl ketone having an active methylene group adjacent to the carbonyl group is reacted in the presence of an alkaline condensing agent with two molecular equivalents of acrylonitrile to form a di-$\omega$-cyanethyl derivative of the ketone. Typical aliphatic methyl ketones which can be used include methyl ethyl ketone, methyl propyl ketone, methyl-n-butyl ketone, methyl-n-amyl ketone, methyl-n-hexyl ketone, methyl-n-heptyl ketone, methyl-nonyl ketone, and their higher homologues; for example, methyl-n-octadecyl ketone. Among the alkaline condensing agents which are effective for promoting this reaction are the oxides, hydroxides, hydrides, amides, and alcoholates of the alkali metals, or the alkali metals themselves. There may also be used strongly basic non-metallic hydroxides, such as the quaternary ammonium hydroxides. Of these, a particularly effective condensing agent is the aqueous solution containing 40% of trimethyl benzyl ammonium hydroxide, which is commercially available under the trade name "Triton B." The quantity of condensing agent required is relatively small, amounts of the order of 1% to 10% on the combined weight of the reactants usually being sufficient. One or several of these alkaline materials are suspended or, preferably, dissolved in the reactive aliphatic methyl ketone itself or in a solution thereof in an inert liquid such as dioxane, ether, benzene, or in a liquid which is less reactive than the reacting components, such as water or tertiary butyl alcohol. The condensation takes place readily at temperatures from about 0° to about 80° C., although initial temperatures of 25° C. to about 45° C. are preferred. The condensation is usually exothermal so that cooling, at least during the initial part of the reaction, is generally advantageous in order to control the vigor of the reaction and to prevent undesired polymerization or side reactions. After the reaction is completed, the condensation product may be isolated and purified or it may be utilized in crude form for the hydrolysis to the acids.

This step is carried out by heating the condensation product with water in the presence of a hydrolytic agent until ammonia has been eliminated. For this purpose, there may be used a solution of an alkali, such as sodium hydroxide or potassium hydroxide, or of an aqueous nonoxidizing mineral acid, such as hydrochloric or sulfuric acid. The alkalies, however, are preferred since there is less tendency for lactone formation. These reaction products may be treated with any strong acid to liberate the desired polycarboxylic acids. Temperatures at about 100–110° C. are generally suitable, but higher temperatures may be used when the hydrolysis is performed under pressure.

The following examples illustrate this invention:

*Example 1*

(a) A mixture consisting of 400 grams of water, 39 grams of potassium hydroxide, and 50 grams of the di-cyanoethylation product of methyl ethyl ketone, melting at 67° C., (obtained by condensing methyl ethyl ketone with two mols of acrylonitrile in the presence of "Triton B") was stirred and boiled under reflux for one hour. The clear solution obtained was acidified to Congo Red indicator with hydrochloric acid and evaporated to dryness under reduced pressure at 80–95° C. The white solid mass was pulverized and extracted with boiling ethylene dichloride. Upon cooling the ethylene dichloride extract to 5° C., crystals separated. Yield, 38 grams. Upon recrystallization from ethylene dichloride, the product formed colorless crystals, soluble in water, melting, when pure, at 125° C., and having the formula:

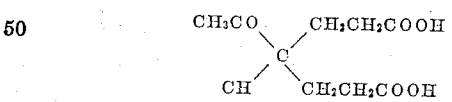

It is soluble in water.

(b) The same product as above is obtained by heating a mixture of 71 grams of the di-cyanoethylation product of methyl ethyl ketone with a solution of 80 grams of 93% sulfuric acid and 45 grams of water at 95–105° C. for five hours, then cooling, adding 100 grams of water and extracting with ether. Upon evaporation of the ether layer, a thick syrup is obtained which crystallizes on standing and which, after recrystallization from ethylene dichloride, melts at 125° C.

*Example 2*

A mixture consisting of 400 grams of water, 88 grams of sodium hydroxide, and 192 grams of the di-cyanoethylation product of methyl-n-propyl ketone, melting at 109° C. (obtained by condensing methyl-n-propyl ketone with two mols of acrylonitrile in the presence of 1% by weight of aqueous 40% trimethyl benzyl ammonium hydroxide) was boiled under reflux for four hours. The clear solution was bleached with charcoal, filtered, and the filtrate acidified with 210 grams of concentrated hydrochloric acid while it was cooled and stirred. The product separated as a white crystalline mass (yield 171 grams) which, upon recrystallization from hot water, separated in colorless needles melting, when pure, at 112–113° C., and having the formula:

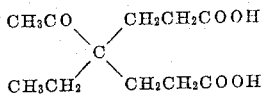

*Example 3*

A mixture consisting of 20 grams of sodium hydroxide, 200 grams of water, and 44 grams of the di-cyanoethylation product of methyl-n-amyl ketone, melting at 63° C. (obtained by condensing methyl-n-amyl ketone with two mols of acrylonitrile in the presence of "Triton B"), was boiled under reflux for 2½ hours, cooled, filtered, and acidified with hydrochloric acid. A heavy oil (45 grams) precipitated. It was separated, washed, dried, and dissolved in benzene. Upon standing, the product separated in crystalline form. The recrystallized, analyzed sample melted at 60–61° C., and had the formula:

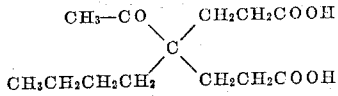

*Example 4*

A mixture consisting of 39.2 grams of potassium hydroxide, 400 grams of water, and 59 grams of the di-cyanoethylation product of methyl-n-hexyl ketone, melting at 47° C. (obtained by condensing methyl-n-hexyl ketone with two mols of acrylonitrile in the presence of "Triton B"), was boiled under reflux for two hours, cooled, filtered, and acidified with 70 grams of concentrated hydrochloric acid. A heavy oil precipitated. It was taken up in ethylene dichloride, washed with water, and the filtered ethylene dichloride extract evaporated to dryness. The viscous syrup weighed 65 grams. It crystallized very slowly on standing. When dissolved in benzene, it crystallized readily in a short time to form colorless crystals melting at 73–74° C., having the formula:

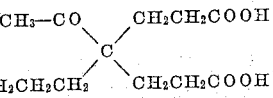

In the same manner, the higher saturated aliphatic methyl ketones yield the corresponding $\gamma$-acetyl-$\gamma$-alkyl pimelic acids, through conversion to di-cyanoethylation products with subsequent hydrolysis.

In general, the di-cyanoethylation product of any saturated aliphatic methyl ketone may be used for the hydrolysis to the corresponding pimelic acid. Thus, the compounds of the formula:

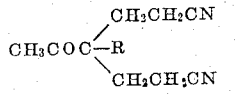

yield acids of the general formula:

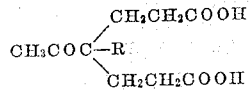

wherein R is any open-chained hydrocarbon group which is straight or branched, short or long, and saturated.

I claim:

1. As a new compound, a $\gamma$-acetyl-$\gamma$-alkyl pimelic acid.
2. As a new compound, $\gamma$-acetyl-$\gamma$-methyl pimelic acid.
3. As a new compound, $\gamma$-acetyl-$\gamma$-ethyl pimelic acid.
4. As a new compound, $\gamma$-acetyl-$\gamma$-amyl pimelic acid.

HERMAN A. BRUSON.